US Patent Office
2,853,475
Patented Sept. 23, 1958

2,853,475

N-CHLORINATED POLYSULFONAMIDES

Wilbur A. Murphey, Wilmington, Del., assignor to E. I. du Pont de Nemours and Company, Wilmington, Del., a corporation of Delaware No Drawing. Application April 30, 1954
Serial No. 426,944

14 Claims. (Cl. 260—79.3)

This invention relates to novel polymeric materials, particularly sulfonamide polymers in which chlorine is linked to the amide nitrogen.

The compositions of this invention are polymeric sulfonamide substances capable of evolving active chlorine. They include new fiber-forming polymers. Germicidal, antivesicant, and deodorant properties of active chlorine suggest the desirability of garments and other textiles comprising such materials.

A primary object of the present invention is production of N-chlorinated sulfonamide polymers. Another object is provision of polysulfonamide compositions capable of controlled evolution of active chlorine. A further object is manufacture of textile fibers and other shaped structures comprising N-chlorinated sulfonamide polymers. Other objects will be apparent from the following descriptive and explanatory text.

Polysulfonamides can be made conveniently by reacting diamines with disulfonyl halides, as taught in Berchet Patents 2,321,890 and 2,321,891, for example. Patent 2,667,468 to Jones indicates that it may be advantageous to form sulfonamide polymers by bringing the respective reactants together in separate phases. Polysulfonamides formed by these or other methods and whether of low or high molecular weight are suitable starting materials for processing according to the present invention. The repeating unit of a polysulfonamide may be represented by formula as

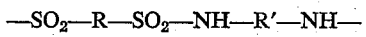

—SO$_2$—R—SO$_2$—NH—R'—NH— where R and R' (which may be identical) are divalent radicals that may be aliphatic with at least two carbon atoms, aromatic, alicyclic, or heterocyclic; either R or R' may carry one or more organic or inorganic substituents or contain hetero atoms, such as nitrogen or sulfur, in their chains. Sulfonamide copolymers may be similarly suitable; they may be produced, for example, by substituting for part of the usual disulfonyl halone other monovalent group, such as a carboxylic halides or substances containing one sulfonyl halide and once other monovalent group, such as a carboxylic halide. Preferred as copolymeric constituents, for reasons evident hereinafter, are those soluble in alkaline medium or in suitable organic solvents. According to the present invention an appreciable fraction of the total amide hydrogen in the starting polymer is replaced by chlorine in the ultimate product. Except where the totally chlorinated compound is desired, part of the total amide hydrogen may be substituted by some other group or groups as well.

In general, the objects of the present invention are accomplished by reacting a sulfonamide polymer with chlorine. Details of the manner of converting the starting polymer to N-chlorinated form appear hereinafter.

Preparation of a particular starting polymer to be processed according to this invention can be summarized as follows: Amounts of 70 parts xylene, 80 parts water, 2.0 parts sodium hydroxide, and 2.9 parts hexamethylene diamine were mixed in a Waring Blendor, along with 0.8 part of an emulsifying agent (Duponol ME). To the resulting emulsion, which reached a temperature of about 30° C., was added over a period of two minutes a solution made up of 7 parts m-benzene disulfonyl chloride and 30.2 parts benzene. The resulting mixture was stirred for from ten to fifteen minutes during which its temperature rose to about 40° C. The mixture was then acidified with hydrochloric acid and heated on a steam bath until the emulsion broke. The polymer was collected by filtration and washed successively with ethanol, acetone, and hot water. After drying at 100° C. in a vacuum oven, 5.5 parts of a white polysulfonamide resulted. The polymer had an intrinsic viscosity of 0.41 in concentrated sulfuric acid.

The above and other sulfonamide polymers may be N-chlorinated by reaction in solid or liquid form, including solution, with gaseous or liquid chlorine or with substances that provide chlorine under the conditions employed. A pH of at least seven is desirable for ready reaction. As many sulfonamide polymers are soluble in aqueous alkali-metal bases, while the chlorinated polymer is not so soluble, a convenient chlorination method lies in dissolving the selected polysulfonamide in aqueous sodium hydroxide and bubbling chlorine gas through the solution. The chlorinated product precipitates as it forms, permitting its easy recovery by centrifuging or filtration of the mixture. The alkali present serves simultaneously to neutralize liberated hydrogen chloride. Instead of chlorine, a chlorine-evolving substance may be added to the solution, e. g., hypochlorous acid, sodium hypochlorite or calcium hypochlorite. Other acid acceptors, such as sodium carbonate or pyridine, may be employed. Progress of the reaction is particularly good at a pH of from about eight to twelve.

In most instances, chlorine reacts promptly with the polysulfonamide, so the reactants need not be heated above ordinary room temperature. Usually, therefore, temperatures at or somewhat below room temperature are satisfactory, although occasionally higher temperatures (perhaps boiling) may be desirable. Reaction in solution facilitates control of reaction rate and temperature. If desired, the sulfonamide polymer may be reacted as a solid dispersed in water or other non-solvent for the polymer, with the pH adjusted and an acid acceptor supplied as above. The products of this invention are characterized by having at least five percent of the total amide hydrogen substituted by chlorine.

Other solvents besides those already mentioned may be utilized as reaction media. If the solvent is miscible with water, e. g., sulfuric acid, pyridine, or N, N-dimethyl formamide the product may be precipitated by adding water to the solution after chlorination is discontinued. Where the solvent is not too miscible with water, e. g., cyclic tetramethylene sulfone, a suitably miscible non-solvent for the chlorinated polymer may be added. Some non-solvents for the chlorinated product are n-heptane, cyclohexane, chloroform, ethanol, and benzene.

The following examples describe the processing of sulfonamide polymers under various conditions according to this invention, parts being by weight.

Example I

An amount of 8.0 parts poly(hexamethylene-m-benzene-disulfonamide) prepared as detailed above is dissolved in 110 parts 10% aqueous sodium hydroxide solution. After standing overnight, the resulting clear solution is treated with a stream of chlorine gas for 10 minutes. The white precipitate that forms almost immediately is filtered off and washed with about 3000 parts distilled water. Drying the precipitate over phosphorus pentoxide in a vacuum desiccator leaves 9.2 parts of a white solid emitting a very faint odor of chlorine. The product, which analyzes 17.63% chlorine, turns moist starch/potassium-iodide paper blue upon contact, and it exhibits an inherent viscosity of 0.31 measured in dimethyl formamide. It may be stored without undue degradation at temperatures up to about 120° C., but it begins to decompose noticeably at 140° to 150° C. and degrades rapidly to a carbonized residue at and above 200° C.

Subjected to similar treatment, poly(hexamethylene-p,p'-diphenylsulfone-disulfonamide) prepared in analogous manner gave a product similar in reaction to starch/potassium-iodide paper and similar in appearance to that just described but containing 13.5% chlorine. Treated in like manner at 60° to 70° C. poly(hexamethylene-hexane-disulfonamide) reacted likewise to give a similar product containing 13.2% chlorine.

*Example II*

An amount of 5 parts hexamethylene-m-benzene-disulfonamide polymer is dissolved in 95 parts dimethyl formamide. After chlorine gas is bubbled through it for 20 minutes, the solution is poured into about 500 parts distilled water. A white precipitate forms promptly and is filtered off. After slurrying with 200 parts distilled water, filtering, and subsequent washing with about 4000 parts distilled water, the white residue gives no visible reaction with starch/potassium-iodide paper for some time. Drying over phosphorous pentoxide at pressure equivalent to 1 mm. of mercury leaves 6.0 parts of a product containing 14.01% chlorine. The inherent viscosity of the product is 0.18 in dimethyl formamide and 0.46 in tetramethylene sulfone.

Similar treatment of poly(hexamethylene-hexane-disulfonamide) prepared in analogous manner gave a product containing 16.5% chlorine and capable of turning starch/potassium-iodide paper blue upon contact; inherent viscosity of the product in dimethyl formamide was 0.2. Treated similarly, poly(hexamethylene-p-cyclohexane-disulfonamide) prepared according to the first example in Patent 2,321,890 also produced a white chlorine-liberating polymer. Like treatment of polysulfonamide prepared in analogous manner from m-phenylene diamine and m-benzene disulfonyl chloride also resulted in an N-chlorinated polymer of similar appearance and chlorine-liberating characteristic.

*Example III*

Poly(hexamethylene-m-benzene-disulfonamide) is dissolved in dimethyl formamide to form a 24% solution by weight. This solution is extruded through a spinneret having 5 holes of 0.15 mm. diameter by application of 40–90 pounds' pressure at 135° C. The resulting filaments are passed through air at about 225° C. then are drawn to 4.5 times their original length at room temperature (71∓1° C.). Wound on a bobbin as 5-end multifilament yarn after the drawing operation, the yarn then is formed into skeins. The skeins are immersed in 0.5% aqueous sodium carbonate. Chlorine gas is bubbled into the water for one hour during which the skeins are agitated continually. Resulting chlorine content of the yarn, whose appearance and physical properties are unchanged, is found to be 1.99%. Blue reaction of starch/potassium-iodide paper shows the yarn to evolve free chlorine.

Exemplified above, N-chlorinated polysulfonamides of the present invention are compounds having the following structure:

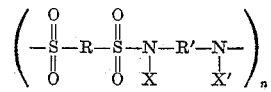

where R and R' are as given above in the structure of the starting polysulfonamides, $n$ is a large positive integer, and X and X' are H or Cl. If totally N-substituted, the molecule contains a number of chlorine atoms equal to $2n$, but the total chlorine content may be less than $2n$; this invention contemplates polymers containing amounts of chlorine even as low as $0.1n$, the rest of the total X and X' then being usually H, although occasionally other substituents may constitute part of the remainder. In addition to the groups appearing in the compounds of the examples, R' may be derived from substantially any di-primary amine, e. g., beta-methylhexamethylene, tetramethylene, pentamethylene, decamethylene, p-phenylene, o-nitro-p-phenylene, m-phenylene, and benzidine diamines, 1,5-diamino, 3-oxapentane and p-aminobenzylamine; and R from many other disulfonyl chlorides in addition to those of the examples, including decane-1,10-disulfonyl chloride and 3,6-dioxaoctane,1,8-disulfonyl chloride. As can be seen from the disulfonyl chlorides recited and from the disclosure of Berchet U. S. Patent 2,321,890, the sulfonyl halide radicals must be located at the terminal carbon atoms in aliphatic disulfonyl halides. Most of the N-chlorinated polysulfonamides are light-colored (usually white) compounds. They are soluble in a wide variety of solvents, including m-cresol, cyclohexanol, a mixture of 10 parts phenol to 7 parts trichlorophenol, and a mixture of 3 parts phenol to 2 parts sym-tetrachloroethane, for example, in addition to those solvents mentioned above. Solutions in phenol-containing mixtures, pyridine, or sulfuric acid appear to degrade slightly with time, even in the absence of light, moisture, and high temperature.

Evolution of chlorine from the polymers of this invention may be promoted by contact with a medium having pH lower than 7. Light and moist air, as well as increased temperature, favor decomposition of the product. Adjustment of these conditions permits control of the rate at which the chlorine evolves. The attainable high molecular weights not only assure solidity of the products but actually permit them or their unchlorinated intermediates to be extruded or molded into shaped objects, such as fibers. Objects shaped from the polysulfonamides may be N-chlorinated as described above (at least to a useful extent on and near the surface) either before or after the shaping operation. Thus, streams of fiber-forming sulfonamide polymer may be extruded directly from a spinneret into a chlorinating bath. Fibers, yarns, fabrics, and other textiles, as well as other materials, made of other polymeric compounds may be treated with N-chlorinated sulfonamide polymers or may be impregnated with the unchlorinated polymers and subsequently chlorinated. Other applications and benefits of this invention will come readily to mind. Notably, the chlorination may be conducted in more than one step, for a partially chlorinated sulfonamide polymer normally is amenable to further chlorination. Thus, a fiber-forming sulfonamide polymer may be chlorinated to some extent before extrusion, then the fiber resulting upon extrusion may be chlorinated further, as desired. Other advantages of preparing the products of this invention by stepwise chlorination will be apparent.

What is claimed:

1. An N-chlorinated polysulfonamide condensation reaction product of about 50 mole percent of a reactant selected from the group consisting of aromatic diamines and aliphatic diamines with at least two carbon atoms, with about 50 mole percent of a reactant selected from the group consisting of aromatic disulfonyl halides, alicyclic disulfonyl halides and aliphatic disulfonyl halides with at least two carbon atoms in which the sulfonic radicals are situated at the terminal carbon atoms, said reaction product being characterized by having at least five percent of the total amide hydrogen substituted by chlorine.

2. The reaction product of claim 1 having the characteristic of evolving active chlorine.

3. The reaction product of claim 1 having an inherent viscosity of at least about 0.18 in dimethylformamide.

4. A fiber comprising the reaction product of claim 1.

5. A textile fabric comprising the fibers of claim 4.

6. The reaction product of claim 1 in which the aromatic diamine comprises up to about two aromatic groups, the aliphatic diamine comprises up to about ten carbon atoms, the aromatic disulfonyl halide comprises up to about two aromatic groups, the alicyclic disulfonyl halide comprises up to six carbon atoms and the aliphatic disulfonyl halide comprises up to about ten carbon atoms.

7. The reaction product of chlorine and a polysulfonamide condensation reaction product of substantially equimolar proportions of a reactant selected from the group consisting of aromatic diamines and aliphatic diamines with at least two carbon atoms and a reactant selected from the group consisting of aromatic disulfonyl halides, alicyclic disulfonyl halides and aliphatic disulfonyl halides with at least two carbon atoms in which the sulfonyl radicals are situated at the terminal carbon atoms, said reaction product being characterized by having at least five percent of the total amide hydrogen substituted by chlorine.

8. The reaction product of claim 7 in which the aromatic diamine comprises up to about two aromatic groups, the aliphatic diamine comprises up to about ten carbon atoms, the aromatic disulfonyl halide comprises up to about two aromatic groups, the alicyclic disulfonyl halide comprises up to six carbon atoms and the aliphatic disulfonyl halide comprises up to about ten carbon atoms.

9. The reaction product of claim 8 wherein the chlorine consists of chlorine gas.

10. The process of N-chlorinating a polysulfonamide condensation reaction product of about 50 mole percent of a reactant selected from the group consisting of aromatic diamines and aliphatic diamines with at least two carbon atoms, with about 50 mole percent of a reactant selected from the group consisting of aromatic disulfonyl halides, alicyclic disulfonyl halides and aliphatic disulfonyl halides comprising at least two carbon atoms in which the sulfonyl radicals are situated at the terminal carbon atoms comprising passing chlorine through a solution of the condensation reaction product in the presence of an acid acceptor.

11. The process of claim 10 in which the aromatic diamine comprises up to about two aromatic groups, the aliphatic diamine comprises up to about ten carbon atoms, the aromatic disulfonyl halide comprises up to about two aromatic groups, the alicyclic disulfonyl halide comprises up to six carbon atoms and the aliphatic disulfonyl halide comprises up to about ten carbon atoms.

12. The process of N-chlorinating a polysulfonamide condensation reaction product of about 50 mole percent of a reactant selected from the group consisting of aromatic diamines and aliphatic diamines with at least two carbon atoms, with about 50 mole percent of a reactant selected from the group consisting of aromatic disulfonyl halides, alicyclic disulfonyl halides and aliphatic disulfonyl halides with at least two carbon atoms in which the sulfonyl radicals are situated at the terminal carbon atoms comprising exposing the condensation reaction product to chlorine in alkaline medium to substitute chlorine for at least one-twentieth of the amide hydrogen.

13. Process comprising reacting with chlorine, in alkaline medium containing an acid acceptor, a polysulfonamide condensation reaction product of equimolar proportions of a reactant selected from the group consisting of aromatic diamines and aliphatic diamines with at least two carbon atoms and a reactant selected from the group consisting of aromatic disulfonyl halides, alicyclic disulfonyl halides, and aliphatic disulfonyl halides, with at least two carbon atoms and in which the sulfonyl radicals are situated at the terminal carbon atom.

14. The process comprising impregnating a textile material with a polysulfonamide condensation product of about 50 mole percent of a reactant selected from the group consisting of aromatic diamines and aliphatic diamines with at least two carbon atoms, with about 50 mole percent of a reactant selected from the group consisting of aromatic disulfonyl halides, alicyclic disulfonyl halides and aliphatic disulfonyl halides with at least two carbon atoms in which sulfonyl radicals are situated at the terminal carbon atoms and exposing the impregnated textile material to chlorine in alkaline medium to substitute chlorine for at least one-twentieth of the amide hydrogen of the polysulfonamide condensation product.

References Cited in the file of this patent

UNITED STATES PATENTS

| | | |
|---|---|---|
| 2,260,367 | Dubeau | Oct. 28, 1941 |
| 2,321,890 | Berchet | June 15, 1943 |
| 2,321,891 | Berchet | June 15, 1943 |

OTHER REFERENCES

"The Chemistry of Organic Compounds," Conant, revised edition, published by Macmillan (New York), 1939, pages 349–361.

UNITED STATES PATENT OFFICE
CERTIFICATE OF CORRECTION

Patent No. 2,853,475                                            September 23, 1958

Wilbur A. Murphey

It is hereby certified that error appears in the printed specification of the above numbered patent requiring correction and that the said Letters Patent should read as corrected below.

Column 1, lines 53 to 55, for "hal-one other monovalent group, such as a carboxylic halides" read -- halides other divalent reactants, such as dicarboxylic halides --; line 56, for "once" read -- one --.

Signed and sealed this 20th day of January 1959.

(SEAL)

Attest:

KARL H. AXLINE

Attesting Officer

ROBERT C. WATSON
Commissioner of Patents